United States Patent
El-Bakry et al.

(10) Patent No.: US 7,747,396 B2
(45) Date of Patent: Jun. 29, 2010

(54) APPARATUS AND METHOD FOR MEASURING LOADS SUSTAINED BY A BEARING PIN

(75) Inventors: Murad El-Bakry, Bristol (GB); Fraser Wilson, Wotton-Under-Edge (GB)

(73) Assignee: Airbus UK Limited, Bristol (GB)

( * ) Notice: Subject to any disclaimer, the term of this patent is extended or adjusted under 35 U.S.C. 154(b) by 332 days.

(21) Appl. No.: 11/793,974

(22) PCT Filed: Dec. 21, 2005

(86) PCT No.: PCT/GB2005/004975

§ 371 (c)(1),
(2), (4) Date: Jun. 25, 2007

(87) PCT Pub. No.: WO2006/067442

PCT Pub. Date: Jun. 29, 2006

(65) Prior Publication Data

US 2008/0125980 A1    May 29, 2008

(30) Foreign Application Priority Data

Dec. 24, 2004   (GB) ................................. 0428378.4

(51) Int. Cl.
   *G01L 1/00*   (2006.01)
(52) U.S. Cl. .................................................... 702/42
(58) Field of Classification Search ................. 702/41, 702/42; 73/862.631
   See application file for complete search history.

(56) References Cited

U.S. PATENT DOCUMENTS

| 4,782,706 | A | * | 11/1988 | Kister et al. ................ 73/779 |
| 4,872,349 | A |   | 10/1989 | Espiritu-Santo |
| 5,076,375 | A | * | 12/1991 | Dillon et al. ................ 177/45 |
| 5,710,716 | A |   | 1/1998 | Hurst et al. |
| 6,082,203 | A |   | 7/2000 | Koivisto et al. |
| 6,273,613 | B1 |   | 8/2001 | O'Brien et al. |
| 6,769,315 | B2 | * | 8/2004 | Stevenson et al. ...... 73/862.629 |
| 2003/0172740 | A1 |   | 9/2003 | Stevenson et al. |

FOREIGN PATENT DOCUMENTS

| EP | 0 319 176 A2 | 6/1989 |
| GB | 2 387 912 A | 10/2003 |

* cited by examiner

*Primary Examiner*—Drew A Dunn
*Assistant Examiner*—Stephen J Cherry
(74) *Attorney, Agent, or Firm*—Patterson, Thuente, Christensen Pedersen, PA

(57) ABSTRACT

A pin bearing arrangement for use on an aircraft landing gear includes a pin and a load sensor arrangement, which may include strain gauges for measuring shear loads and accelerometers for measuring loads sustained by the pin. The pin includes a self-contained data logging device for logging data concerning loads sustained by the pin. Thus, inside the pin, there may be provided a processing unit, a memory store, and a battery-based power source. During normal operation of the aircraft fatigue loads may be monitored, the processing unit receiving input signals from the means for measuring loads and storing load data in the memory. The stored load data may periodically be extracted from the memory during maintenance of the aircraft.

15 Claims, 3 Drawing Sheets

APPARATUS AND METHOD FOR MEASURING LOADS SUSTAINED BY A BEARING PIN

RELATED APPLICATIONS

The present application is a National Phase entry of PCT Application No. PCT/GB2005/004975, filed Dec. 21, 2005, which claims priority from United Kingdom Application Number 0428378.4, filed Dec. 24, 2004, the disclosures of which are hereby incorporated by reference herein in their entirety.

TECHNICAL FIELD

The present invention relates to an apparatus and method for measuring the loads sustained by a pin of a pin bearing arrangement. In particular, the invention relates to the measuring of loads sustained by a bearing pin of an aircraft component such as landing gear.

BACKGROUND OF THE INVENTION

U.S. Pat. No. 6,273,613 describes a pin bearing arrangement for use on an aircraft landing gear wherein the pin includes strain gauges for measuring shear loads sustained by the pin. The bearing pin is used to measure loads during testing of aircraft landing gear, in particular during development and design of a landing gear. When measuring loads with a pin such as that disclosed in U.S. Pat. No. 6,273,613 it is necessary to connect the outputs of the strain gauges to one of the aircraft's computer systems. This connection is typically provided by means of wires carrying electronic signals from the strain gauges to the aircraft computer system or specially provided separate data logging equipment. For example, in one known system, the signals from the strain gauges are recorded by means of a data recorder that is provided in the pressurised cabin of the aircraft. The data is received by the recorder by means of wires leading from the strain gauges via signal conditioning units mounted in the landing gear bay. The power required to operate that system is drawn from the aircraft system power supply. Thus the installation of such load measuring pins is cumbersome and time consuming. Furthermore, as a result of there being a physical connection from a portion of the landing gear to the aircraft computer the reliability of the load measuring system depends on a good connection being maintained by the wiring all the way between the pin and the computer system. Also, such an arrangement needs to be regularly maintained, requiring further labour. As a result of such disadvantages such load measurement systems are typically only used during testing and certification procedures and are therefore of limited use.

The present invention seeks to provide an improved apparatus and method for measuring loads sustained by bearing pins. Alternatively or additionally, the present invention seeks to provide an apparatus or method for measuring the load sustained by a bearing pin that mitigates one or more of the above-mentioned disadvantages with the acknowledged prior art.

SUMMARY OF THE INVENTION

According to the present invention there is provided a pin bearing arrangement including a pin and means for measuring loads sustained by the pin, wherein inside the pin there is provided a processing unit, a memory store, and a power source for powering the processing unit, the processing unit being arranged to receive input signals from the means for measuring loads and to store data in the memory store relating to the loads sustained by the pin during use. Thus the pin bearing arrangement is able to perform the function of a self-contained load data logging device for logging data concerning loads sustained by the pin. There is therefore no need for any part of the pin bearing arrangement (in particular, the means for measuring loads) to be connected to any part of the aircraft's standard computer systems.

In contrast to the prior art mentioned above, the pin bearing arrangement of the present invention may be installed with relative ease and without impact on other systems of the aircraft. The pin bearing arrangement may therefore not only be used during testing and improving design of an aircraft, but advantageously also during normal operation of the aircraft. Using such a load data logging device during operation is of particular benefit as the data logged may be used to monitor fatigue loads during operation. Thus, more accurate estimates may be made of the fatigue lifetime of a component of the aircraft than might otherwise be possible. It should be noted that the effects of loads on fatigue life is an $8^{th}$ power function and therefore any small variation in the fatigue loads sustained by a component of the aircraft may have a significant impact on the fatigue life of that component. For example, a 1% increase in average fatigue load will reduce fatigue life by 8% and an increase in an average load of only 3% would be sufficient to reduce fatigue life by about 21%.

Given the self-contained nature of the pin bearing arrangement according to the present invention, such an arrangement may be used in respect of a multiplicity of bearing pins on the aircraft and advantageously loads on landing gears may be monitored and logged on a gear by gear basis.

The pin bearing arrangement may include additional sensors or devices for making measurements of other parameters. For example, there may be provided an accelerometer inside the pin. The means for measuring loads sustained by the pin may be in the form of any suitable load sensor arrangement. For example, the means may be in the form of a strain gauge. Preferably the means for measuring loads sustained by the pin comprises a plurality of strain gauges. The strain gauges are conveniently arranged such that shear loads sustained by the pin during use may be measured. The data stored by the processing unit in the memory store during use may for example include data relating to such shear loads. The means for measuring loads may be arranged to measure loads having at least three degrees of freedom. The means for measuring loads may for example be able to measure loads in three orthogonal axes. The means for measuring loads may additionally or alternatively be arranged to measure a torque. There may be provided more than five strain gauges. The means for measuring loads may include a plurality of accelerometers.

The pin bearing arrangement may include a pin greasing device. The pin greasing device is conveniently provided inside the pin.

In certain situations (for example when measuring torque in a particular way) any relative rotation of the pin arrangement may affect the accuracy of the load measurements made. The pin arrangement may be arranged such that, in use, it does not undergo relative rotation, for example rotation relative to another part of an apparatus of which the pin forms a part or rotation relative to part of the surrounding structure in the immediate vicinity. Alternatively, the pin arrangement may comprise a means for measuring any relative rotation of the pin. The means for measuring the relative rotation may comprise a gyroscopic compass. Data concerning the relative rotation as measured may be stored in the memory store. Such additional data may subsequently be used together with the other data stored in the memory store to take into account rotation of the pin, for example when calculating loads sustained by the pin.

The pin bearing arrangement may include a data transfer means for transferring data from a component (for example, the processing unit or the memory store) inside the pin to outside of the pin. The data transfer means may comprise a transducer for converting electronic signals representing data stored in the memory store into electromagnetic radiation signals, for example optical signals or radio signals. Alternatively, or additionally, an electronic connector may be provided for facilitating an electrical connection between the processing unit (and/or memory store) and an external device for transmitting data therebetween.

The memory store may comprise a memory store device arranged to be able to be removed from the pin whilst retaining data stored in the device. Such a removable memory store device may thereby facilitate the periodic retrieval of stored data from the pin. It will be appreciated that data may additionally be retrievable from the memory store by other means, not necessitating removal of a memory store device. The memory store may comprise a plurality of such removable memory store devices. The or each removable memory store device may comprise a removable compact flash card device.

The pin bearing arrangement preferably includes power saving means for automatically reducing power consumption in the event that no loads meeting pre-set criteria are being sustained by the pin. Power consumption may for example be reduced in the event that no loads are being sustained by the pin or in the event of the loads as measured, if any, being below a given threshold. For example, the power saving means may be arranged to periodically ascertain whether the pin is being subjected to such a load, for example a load meeting a pre-set criteria. The means may be arranged, in the event that it is ascertained that the pin is sustaining such a load, to cause the processor to start storing data in the memory store relating to the loads subsequently sustained by the pin.

The data stored in the memory store may be retrieved on a periodic basis. For example, the data may be retrieved during maintenance of the aircraft. The memory store is preferably large enough to store data so that the data need only be retrieved no more frequently than once every nine weeks. The data may be retrieved by physically removing from the pin the media on which the data is stored. Alternatively, or additionally, the data may be retrieved by sending the data by means of signals passing from within the pin to outside the pin. For example, relatively small amounts of data relating to the loads sustained by the pin over a relatively short period of time (for example periods of the order of minutes or hours) may conveniently be retrieved by sending the data by means of signals passing from within the pin to outside the pin, whereas relatively large amounts of data relating to the loads sustained by the pin over a relatively long period of time (for example of the order of weeks of service) may be more readily retrieved by removal of a removable data store device.

The data stored by the process in the memory store preferably includes data concerning the time of the measurement. Thus the load measurements may be compared with recorded information concerning the manoeuvres made by the aircraft at a particular time.

The pin bearing arrangement may further include a displacement sensor, for example for measuring the displacement of one part of the machine or apparatus of which the pin forms a component to another part. For example, when the pin is used on a landing gear, a sensor for measuring the extension of a shock absorbing part of the landing gear may be provided.

The pin bearing arrangement may also include a sensor for measuring the hydraulic pressure in the oleo struts of a landing gear. Such sensors may need to be provided externally of the pin, and may therefore be required to send to the pin signals representative of the measurements made by the sensors.

The arrangement may be provided as a part of a pin bearing arrangement on a part of an aircraft. In particular, the pin bearing arrangement may provide a bearing pin of a landing gear, for example the bogie beam pivot pin or the side stay pin. Thus the present invention provides an aircraft landing gear including a pin bearing arrangement according to any aspect of the present invention.

The present invention also provides a method of logging data concerning the loads sustained by a pin of a pin bearing arrangement, the method including the steps of measuring loads sustained by the pin, and storing data relating to the measured loads in a memory store inside the pin.

The step of storing the data is preferably effected by a processing unit inside the pin. The processing unit is preferably powered by means of a power source inside the pin. It will be appreciated that any of the features described in relation to the pin bearing arrangement of the present invention may be incorporated into the method of the present invention. For example, the method may use a pin bearing arrangement according to any aspect of the present invention described herein.

The present invention also provides a method of improving the design of an aircraft, the method including the steps of logging in a memory store data concerning the loads sustained by a pin of a pin bearing arrangement that forms part of the aircraft, extracting the data from the memory store, analysing said data and in view of said data modifying the design of the aircraft.

The present invention also provides a method of assessing the distribution of the weight of an aircraft, the method including the steps of logging data concerning the loads sustained by a pin of a pin bearing arrangement of each of a plurality of landing gears of the aircraft, the data logged in respect of each landing gear being logged in a respective memory store associated with that landing gear, extracting the data from the memory stores, and calculating from said data information concerning the share of the weight of the aircraft supported by each of the plurality of landing gears.

The present invention yet further provides a method of assessing the operational lifetime of an aircraft or a component part thereof, the method including the steps of logging in a memory store data concerning the loads sustained by a pin of a pin bearing arrangement that forms part of the aircraft, extracting the data from the memory store, assessing the operational lifetime of the aircraft or the component part thereof in view of said data.

The step of logging said data in any of the above-described methods may be performed by using the pin bearing arrangement according to any aspect of the present invention or by performing the method according to any aspect of the present invention described herein. It will therefore be appreciated that the pin of the present invention has many different applications. The memory store may be provided inside the pin when the data is logged. The step of extracting the data from the memory store may be performed in such a way that the memory store is first removed from inside the pin. For example, the method may include steps of removing a removable memory store device containing logged data from the pin and replacing the removed memory store device with a different memory store device with free capacity to store further data. As mentioned above, the data may, alternatively or additionally, be retrieved by sending the data by means of signals passing from within the pin to outside the pin.

The step of assessing the operational lifetime of the aircraft or the component part thereof may compare the extracted data with further data derived from information concerning the loads sustained by a pin of a pin bearing arrangement that forms part of another aircraft. The further data may for example have been derived by use of a pin bearing arrangement or by performing a method according to any aspect of the present invention described herein. The further data may also include information concerning the operational lifetime of that aircraft, or of the component part of that aircraft (as appropriate), such information having been assessed by independent means. Thus, information concerning the operational lifetime of a first aircraft or component part thereof may be derived from measuring loads sustained by a pin of the aircraft and comparing the loads as measured with reference data concerning loads sustained by a second aircraft or component part thereof, having a known operational lifetime, thereby allowing a calculation of the operational lifetime of the first aircraft, or component part thereof, by using standard mathematical techniques. Preferably, the further data, or reference data, is derived from measurements made in respect of a multiplicity of aircrafts or components thereof.

The present invention also provides a pin bearing arrangement including a pin, and means for measuring loads sustained by the pin, wherein inside the pin there is provided a processing unit, a memory store connector, and a power source connector. The power source connector may be arranged to facilitate power to be supplied to the processing unit. The memory store connector may be arranged to facilitate transfer of data between the connector and the processing unit (for example when a memory store is connected to the connector). The pin bearing arrangement may be so arranged that if a memory store were connected to the memory store connector and a power source were connected to the power source connector the pin bearing arrangement would then be a pin bearing arrangement according to any aspect of the invention described herein or would be able to perform the method according to any aspect of the invention described herein.

The present invention yet further provides a method of manufacturing a pin bearing arrangement, the method including the steps of providing a bearing pin and a load measuring and data logging system comprising a processing unit, a memory store connector, a power source connector and a means for measuring loads, mounting the means for measuring loads on or in the bearing pin, mounting the processing unit, the memory store connector, and the power source connector inside the bearing pin, providing power to the load measuring and data logging system, applying independently known conditions to the load measuring and data logging system, measuring one or more outputs of the load measuring and data logging system, and adjusting calibration settings of the load measuring and data logging system in dependence on both the independently known conditions and the one or more outputs as measured, The independently known conditions applied to the load measuring and data logging system may for example be known electronic signals or may be in the form of a known load applied to the means for measuring loads. The steps of the above method need not be conducted in the order in which they are presented above. For example, especially in the case where the step of applying independently known conditions is in the form of applying electronic signals, the step of adjusting the calibration settings may be performed before mounting the components of the arrangement on or inside the bearing pin. The calibration settings that are adjusted may include one or more of the group of settings consisting of gain, zero offset and temperature coefficient. The pin bearing arrangement so manufactured may be in the form of pin bearing arrangement according to any aspect of the present invention described herein. For example, the method of manufacturing may further include the steps of connecting a memory store to the memory store connector and connecting a power source to the power Source connector.

The invention further provides an aircraft including a plurality of landing gears, wherein each landing gear includes a pin bearing arrangement according to any aspect of the present invention. The plurality of pins may enable loads on landing gears to be monitored and logged on a gear-by-gear basis. Information on loads sustained on a gear-by-gear basis can allow for information concerning the distribution of loads across the aircraft to be calculated.

BRIEF DESCRIPTION OF THE DRAWINGS

By way of example an embodiment of the invention will now be described with reference to the accompanying schematic drawings, of which.

DETAILED DESCRIPTION

Figure 1:
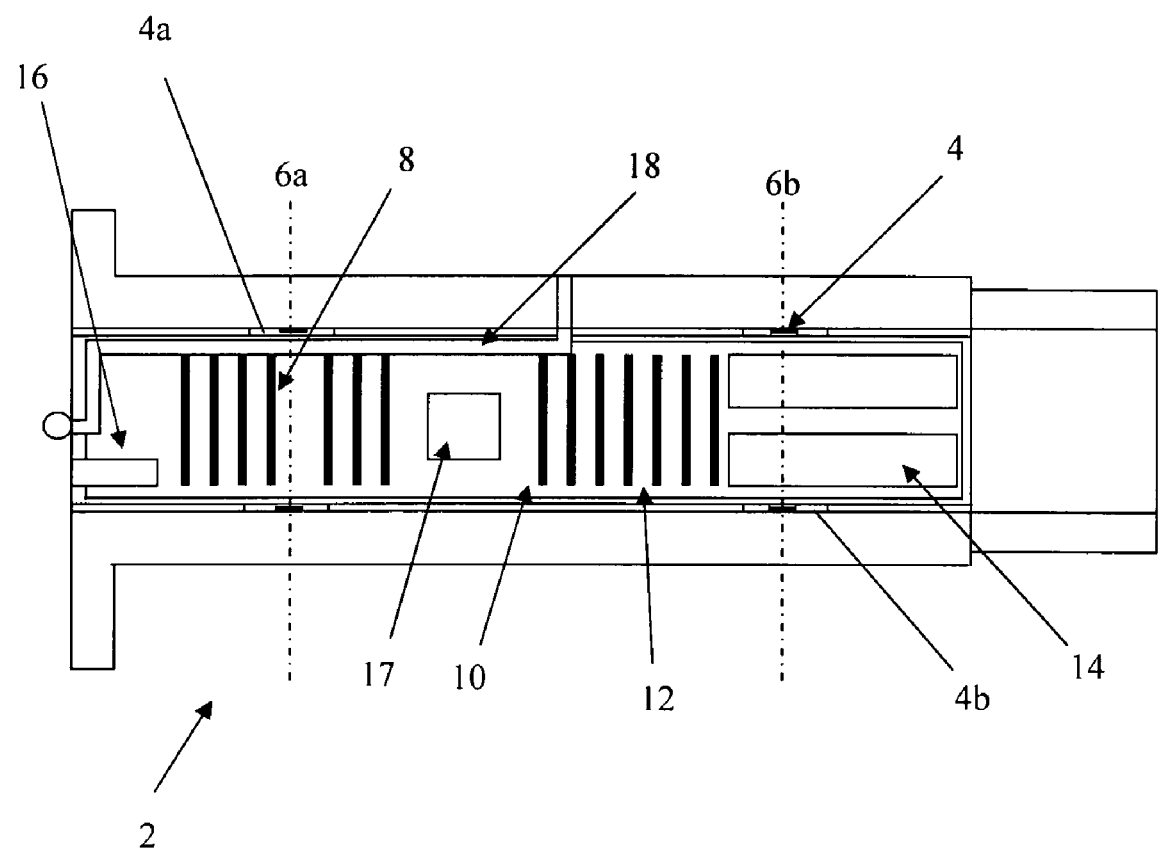
FIG. 1 is a bearing pin including a data logging system therein.

FIG. 1 shows a bearing pin 2 in cross-section. The bearing pin may be provided as a bearing pin connecting elements or components which together form a clevis arrangement, in a manner similar to that described in U.S. Pat. No. 6,273,613. The bearing pin 2 is in the general form of a hollow cylindrical tube, measuring about 500 mm in length and having a diameter of about 130 mm.

The pin 2 houses various components. On the interior surface of the bearing pin 2 there are mounted eight strain gauges 4. Four strain gauges 4 are positioned equi-axially at the same position along the length of the bearing pin 2 as a plane 6a of constant shear stress. A second set of four strain gauges 4b are similarly positioned at a second plane 6b of constant shear stress. Together the eight strain gauges 4 are thus able to measure loads in the X, Y, Z directions as well as measuring to torsional loads. Each plane of constant shear stress of created by means of a groove in a bushing (not shown separately) provided around the pin (the grooved bushings create loads of constant shear stress in much the same way as the grooves provided in the bearing pin of U.S. Pat. No. 6,273,613), but allow the external load-bearing structure of the pin to remain substantially the same as existing pins.

Various electronic devices including PCBs (printed circuit boards) are provided inside the bearing pin 2 including signal conditioning PCBs 8, processing unit PCBs 10 and memory devices 12. A power source, in the form of batteries 14, provides power to the various components inside the bearing pin 2. The batteries are in the form of Lithium Thionyl Chloride batteries.

Other measuring devices are provided in addition to the strain gauges 4 and include accelerometers 17 inside the pin and a number of devices positioned outside of the pin including a pressure transducer (not shown) providing measurements of the hydraulic pressure in the landing gear oleo strut, and a displacement sensor (also not shown) providing a measure of the extension of the landing gear oleo strut (i.e. the shock absorber travel of the main shock absorbing part of the landing gear). The pressure transducer for measuring hydraulic pressure comprises a strain gauge and therefore has an output level similar to the other strain gauges 4 used in the present embodiment. A jack connector 16 is provided for transfer of data to and from the data logging system (comprising the various PCBs). The jack connector 16 thus provides a direct electrical and physical connection that enables a laptop to "link-up" with the pin. A laptop can thus be linked to the electronic devices in the pin and used to make/change settings and to diagnose problems or perform troubleshooting.

A pin greasing function in accordance with known techniques is provided by means of a greasing tube 18.

Prior to installation of the bearing pin 2 the pin is pre-calibrated by means of applying loads to the pin on a loading rig and adjusting calibration settings of components on the PCBs to compensate for any tolerance errors in the components of the pin 2. The pin 2 is then installed in situ on the aircraft. In this case the pin 2 forms a bogie beam pivot pin. (It will be appreciated that similar designs of pin may be used in other applications on the aircraft, for example as a side stay pin).

During operation, the processing unit 10 of the pin 2 monitors and logs data concerning loads measured by the strain gauges 4 and stores that data in a removable part of the memory store 12 (in the form of a compact flash card memory device, which is not separately shown in FIG. 1).

The data logging is active only during such times as loads are sustained by the pin 2. Thus, when the landing gear (not shown) is stowed in the landing gear bay, the system is in an inactive/sleep mode, thus conserving battery life. The pin 2 conserves energy by remaining in this sleep mode until a state change is detected which requires logging of data.

Data is logged in accordance with the above-described method for a period of about 9 weeks. The data logged in the compact flash card memory device of the memory store 12 is retrieved after this period by removing the compact flash card memory device and replacing it with a substantially empty flash card memory device. At the time of removing the "full" flash card memory device, the health of the pin 2 is also assessed and, if appropriate, the batteries 14 would be recharged or replaced.

Figure 2:
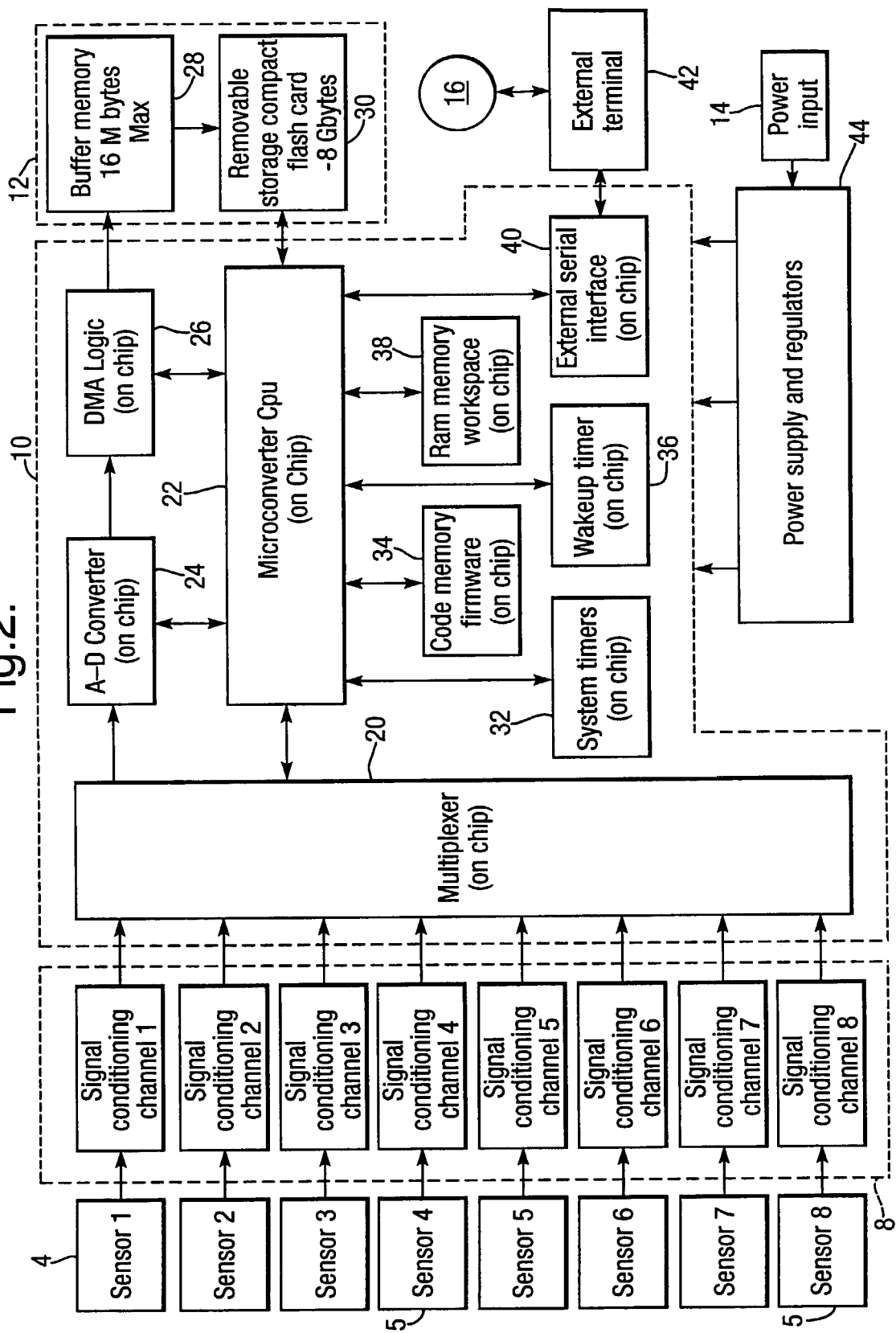
FIG. 2 is a block diagram illustrating the function of the data logging system in the bearing pin.

The data logging system will now be described in further detail with reference to FIG. 2 which is a block diagram illustrating the function of the system. Thus, the block diagram shows various sensors 5, the signal conditioning PCBs 8 (represented by the box 8 shown in broken lines), the processing unit 10 (the box labelled 10), the memory 12 (the box labelled 12, the power source 14 and the jack connector 16 for providing data transfer to and from the processing unit 10. The various components forming the data logging system of FIG. 2 will now be described.

The sensors 5 include the strain gauges 4, accelerometers 17, and the hydraulic pressure transducer (not shown) and the displacement sensor (not shown). The eight strain gauges produce four differential strain gauge signals and the accelerometers produce three channels of acceleration data (one for each orthogonal axis). The hydraulic pressure and displacement sensors each produce one stream of measurements. Therefore there are a total of nine sensor channels (only eight of which are shown in FIG. 2).

The processing unit 10 is in the form of a microprocessor chip (or chips). Each sensor 5 sends signals to a respective signal conditioning unit 8 which in use adjusts the gain and scale factor to match the input level requirements of a multiplexer 20 (included in the processing unit 10) that receives the converted conditioned signals from the sensors 5. The multiplexer 20 samples the conditioned signals received from signal conditioning units 8 in sequence and sends the multiplexed signal to the memory store 12 under the control of a microconverter CPU 22. The multiplexed signal passes via an A-D (analogue to digital) converter 24 and a DMA (Direct Memory Access) logic unit 26 that manages the flow of the data from the A-D converter 24 to the memory store 12.

The memory store 12 includes a buffer memory 28 that stores raw data from the A-D converter 24 whilst the system is in the process of measuring and logging data. The memory store 12 further includes a removable storage compact flash card memory device 30 that is used for bulk data storage. After a measuring and logging session is completed the raw data stored in the buffer memory 28 is formatted and then saved onto the flash card device 30 under a file name that is unique for each data logging session. Each sensor is sampled about 500 times a second. Over a period of nine weeks the typical amount of data stored in the compact flash card would be about 6 Gbytes.

As mentioned above, the process of logging data and the control of the processing unit 10 in general is effected by means of a microconverter CPU 22, which has an 8051 based internal architecture. The microconverter CPU 22 is provided with system timers 32 including a clock, code memory firmware 34 on which the software/firmware providing the function of the data logging system is stored, a wake up timer 36 programmed to enable the system to switch between sleep mode (for saving power) to active mode, a ram memory work space 38 (volatile memory) for use by the microconverter 22 for stack and storage of temporary system variables and an external serial interface 40 in the form of an RS232 communications link providing the facility to link to external devices via an external terminal 42.

Power is supplied to the processing unit 10 from the power source 14 via power supply and regulators 44 which contain circuitry to condition and stabilise the raw battery power so as to be suitable for use by the various components of the processing unit 10.

The software stored in the code memory firmware 34 comprises various modules which will now be described.

A power-on/self-test module is arranged to be called shortly after initial power-up to validate system hardware before calling the main application. It tests on-chip hardware such as the CPU 22, RAM memory 38 and peripherals, before moving off-chip to test external devices such as signal conditioning units 8, buffer memory 28, power control 44 and flash card storage 30.

A watchdog recovery module is arranged to attempt to recover and determine the cause in the event that the system fails or crashes. Depending on the nature of the failure, the system may restart normal operation, power down completely, or enter an indeterminate state. In all cases, some attempt is made to log as much information as possible about the error, in non-volatile memory, so that the failure mode may be determined at service interval.

A system health monitoring module is arranged to monitor system health, checking for normal/abnormal patterns of operation and to verify that the hardware is operating within defined limits. It is run periodically during periods of inactivity, that is, while the system is not logging data.

A power control module is arranged to coordinate the switching of power to the various hardware subsections in response to system change requests. It also measures and provides battery discharge and current consumption information to other modules (i.e. system status) to allow ongoing monitoring of remaining battery service life.

A real time clock module is arranged to be responsible for setup and maintenance of the time of day/real time clock device. It provides time of day/day/month/year information to the compact flash card file system module for data file timestamping.

A wakeup management module is arranged to be responsible for initialisation and management of the power down/wakeup timer 36. It also contributes to the control of state transitions between power down, check and log data states (described in further detail below).

A data logging module is arranged to manage the data acquisition process and coordinate transfer of data from the A-D converter 24 to buffer memory 28. It initialises the buffer memory 28 with the required sensor channel count and sequence, sets up the A-D converter 24, starts DMA control logic for data transfer and passes control to the compact flash file system module once the log session is complete.

A compact flash card file system module is arranged to format the log session a-d data samples from the buffer memory 28 into a defined byte stream and save this under a unique timestamped file on the compact flash memory card 30. It is also responsible for other file system related tasks, such as requests from the system status/error log module.

An external interface module is arranged to provide a text menu based user interface to external devices such as terminals or laptop computers and provides a command line style interface for interface to script based operations. It also provides facilities to input calibration data, monitor system operation and recover log data from the compact flash card on a named file basis.

A system status and error log module is arranged to gather status information from various subsystems, format the data and save into a named log file on the compact flash memory card 30. For example, data recorded may include number of log sessions, current battery voltage, minimum and maximum system temperatures. It also timestamps and logs abnormal status events, including the result of any watchdog timeout event. This module also initiates a system shut-down for fatal error conditions (for example, low battery voltage or compact flash card filesystem full).

A system control and scheduling module controls and coordinates the activities of all the system application modules and their interactions. Process scheduling is implemented as a simple state driven process with defined state transitions to reduce system resource requirements.

System device driver modules are also provided which all communicate directly with system hardware. They provide the link between system application modules and hardware devices and abstract hardware functional detail into higher level system services.

Figure 3:
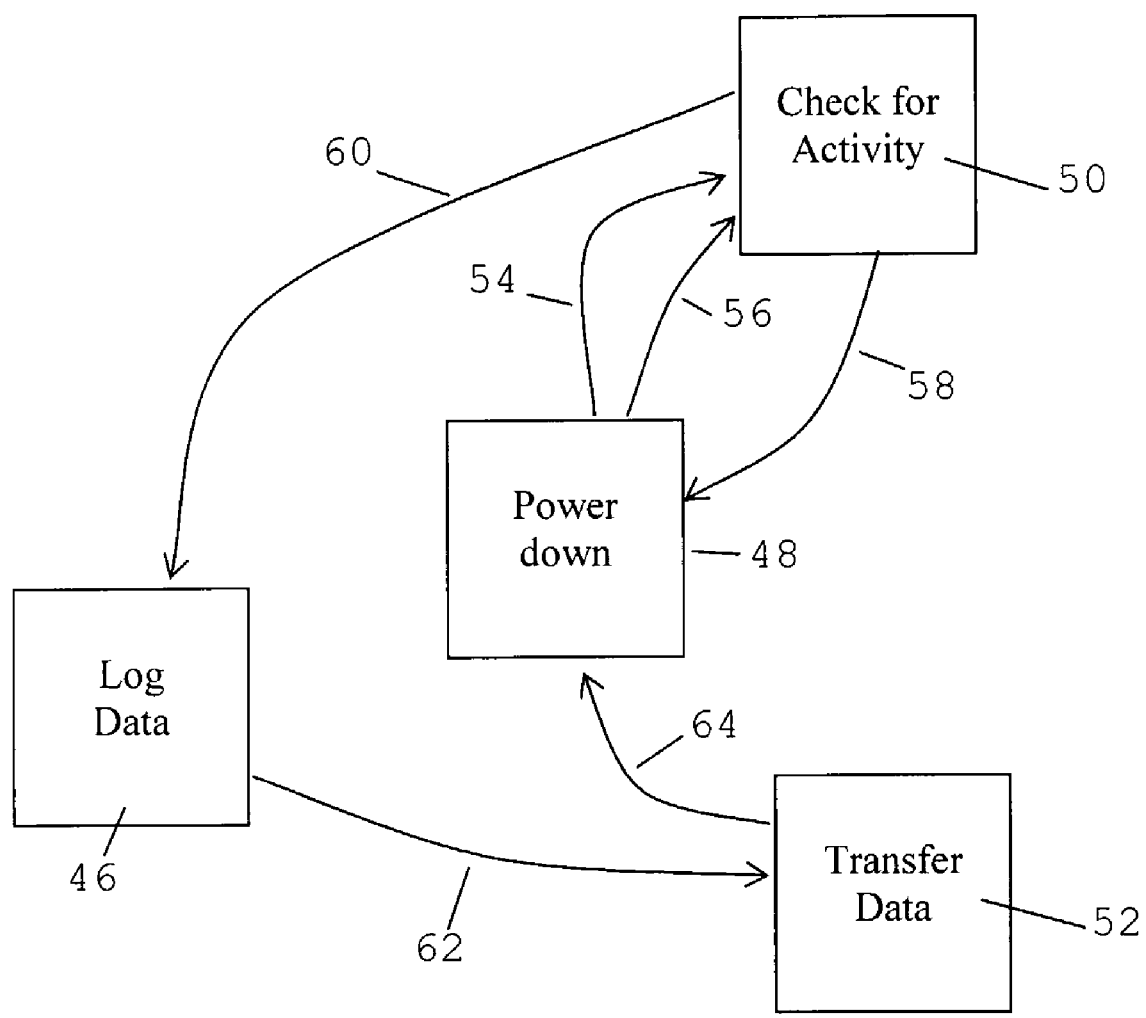
FIG. 3 is a block diagram illustrating various states of the data logging system.

Above it is mentioned that the system is state driven and that there are means for conserving power consumption and that there is provided a wake-up management software module. With reference to FIG. 3 there are four main states in which the system may be in, namely a data logging state 46, a power down mode 48, an activity checking state 50 and a data transfer state 52. The system will normally exist in a single state (as represented by the diagram shown in FIG. 3), although as is explained below the system may in certain circumstances operate in more than one state at a time. In power down mode 48 only the wake-up timer 26 remains active and thus power drain is at a minimum. In the activity checking state 50 the system checks the various sensors 5 for activity for a period of about 10 milliseconds. In the data logging state 46, data derived from the signals from the sensors 5 is stored in buffer memory 28. In the data transfer state 52, data is transferred from the buffer memory 28 to the compact flash card memory 30.

Possible state transitions are shown in FIG. 3 by means of arrows 54 to 64. When in power down mode 48 the wake-up timer module causes the system to transfer (arrow 54) to the activity checking state once every second. Also, when in power down mode 48 if there is activity, other than changes in load, that might require data to be logged (for example the landing gear is moved from its stowed position in the landing gear bay to its operational position) the system changes (arrow 56) to the activity checking state 50. Once in the activity checking state 50, the sensor activity is measured and if the activity is below a given threshold, the system state reverts (arrow 58) to power down mode 48. If however the sensor activity is above a given threshold, the system moves (arrow 60) to the data logging state 46. Thus, if the loads in the strain gauges 4 remain substantially constant for a given length the system may revert to power down mode, until changes in loads are detected.

Once in the data logging state 46, the system state changes only after all the required data has been logged (which may be set by the expiry of a pre-set time period and/or may be determined as soon as sensor activity drops below a given threshold). For example, if there are no substantial changes in the parameters as measured for a given length of time, the system state will change from data logging state 46. Then the system state moves (arrow 62) to the data transfer state 52. Once all data has been transferred from the buffer memory 28 to the compact flash card memory 30, the system moves (arrow 64) from the data transfer state 52 to the power down mode 48. As mentioned above, the system can effectively be in two states at a time, there being dual activity. For example, in the data logging state 46, if the buffer memory 28 is close to its capacity it may be necessary to transfer data from the buffer memory 28 to the compact flash card memory 30, whilst still logging data.

In use, data is logged during take-off and landing and therefore measurements are taken both when the aircraft is on the ground and in the air. By way of example, consider a flight time of 1 hour, the time spent logging data whilst the aircraft is airborne would be about 10 minutes per flight, whilst the log time per flight in relation to ground movement would be about 20 minutes per flight. During a 9 week period, the system might typically be operated in power down mode for about 1250 hours compared to about 250 hours when not in the power down mode (that time being spent mostly in the data logging mode 46). As mentioned above, the data logged in the removable storage compact flash card memory device 30 may be retrieved once every 9 weeks by removing the compact flash card memory device 30. Also, a laptop can be used to retrieve small amounts of data logged in the memory store 12 in circumstances where it might not be appropriate to remove the removable storage compact flash card memory device 30. Such data may be retrieved by linking the laptop to the memory store 12 via the jack connector 16.

The pin 2 may be used as part of a flight test system or as part of an in-service system. When used on a flight test system the data acquired may be used with other data to improve the modelling of the landing gear and aircraft and, ultimately, their design. Such other data may include data acquired in-service. Also, data acquired in-service can be used to improve the modelling and/or design of the landing gear and aircraft when incorporated with flight test data acquired by other means. When used in service, the data logged by the pin 2 can be used in a variety of different other ways. The data can be used to monitor fatigue loads. The data can be used to provide information concerning unexpectedly high or different loadings (such as loadings sustained during hard landings or off-runway events). The data can be used to provide information concerning the expected lifetime of the landing gear or other components on the aircraft. Given that the data acquired by the pin can be used to calculate the load sustained by the landing gear at a given time, the pin can be used to calculate the weight of the aircraft as supported by the gears on a gear by gear basis (if suitable pins are installed in all landing gear of the aircraft). Such information can then be used to provide immediate and accurate information to ground staff (using the laptop link-up via the interface 16 of the pin) concerning not only the weight of the aircraft, but also the distribution of that weight across the aircraft. Thus, the pin 2 can be used to provide both "weight and balance" information (i.e. information concerning the distribution of weight along the longitudinal axis of the aircraft, such information typically being needed to ensure a safe take-off) and "load-share" information (concerning the left-right split of the weight).

It will be seen that the pin 2 is able to achieve many different objectives. It allows the development of an up-to-date, representative, landing gear operational fatigue spectrum, thus providing information concerning the magnitude of loads associated with manoeuvres made by the aircraft in-service and the frequency of occurrence of these loads and manoeuvres. It allows the development of an up-to-date, representative, landing gear operational usage spectrum for wear sensitive parts, thus providing information concerning the magnitude of displacements associated with loads and manoeuvres made by the aircraft in-service and the frequency of occurrence of these displacements with manoeuvres. The pin also enhances the investigation capability of in-service occurrences through detailed measurement of loads and other parameters on the landing gear during operation and while undergoing various manoeuvres. Also, it provides information concerning the landing gear systems' dynamics and interactions during manoeuvres through data analysis and simulation modelling.

The pin being in the form of self-contained device may easily be retrofitted on most aircraft without requiring any change to the aircraft structure or existing aircraft system. The bearing pin and measurement logging system may form part of a new landing gear health monitoring system, in that data logged by the bearing pin may be periodically downloaded and used with other data to assess and monitor the structural integrity of the landing gear.

Whilst the present invention has been described and illustrated with reference to a particular embodiment, it will be appreciated by those of ordinary skill in the art that the invention lends itself to many different variations not specifically illustrated herein. For that reason, reference should be made to the claims for determining the true scope of the present invention. By way of example only, various modifications that may be made to the above-described embodiment will now be described.

The system of the embodiment described above is stated as comprising nine sensor channels received by a single multiplexer and A-D converter. It will however be appreciated that the function of the processing unit 10 and signal conditioning units 8 could be broken down into separate subsystems. For example, there may be two separate subsystems, each handling eight sensor channels each, thereby providing sixteen sensor channels allowing seven extra inputs if desired for other purposes. For example, the micro-converter model ADUC831 from Analogue Devices Inc. (see www.analogue.com) has eight such channels.

The pin may have grooves formed in its external surface to form regions of constant shear stress in a manner similar to the grooves formed in the pin disclosed in U.S. Pat. No. 6,273,613.

Torsional loads need not be directly measured, since they may be calculated from the orthogonal strain gauge measurements. For example, the vertical torque may be calculated from the load in the X direction. In a particular embodiment, such a calculation is relatively straightforward because the bogie pin is arranged not to rotate in the bogie beam. The anti-rotation mounting is carefully designed so as not to introduce new stress or load paths. In a further embodiment, a gyroscopic compass is mounted in the bogie pin to calculate the position of the pin and adjust the strain gauge readings as appropriate.

Instead of providing a removable flash card memory device, the data logged by the system could alternatively be stored in memory and then downloaded in its entirety from the pin into a laptop via an appropriate connection/interface. It will be appreciated that the jack connector provided for data transfer may be in the form of any other suitable device for facilitating data transfer. Wireless network protocols may be used to facilitate such data transfer. An optical coupling device could also be used.

It is mentioned above that, when the system is in the power down mode, if the landing gear is moved from its stowed position in the landing gear bay to its operational position the system changes to the activity checking state. The system could of course instead change directly to the data logging state.

The invention claimed is:

1. A pin bearing arrangement for an aircraft component, the pin bearing arrangement including a pin and a load sensor arrangement for measuring loads sustained by the pin, wherein inside the pin there is provided a processing unit, a memory store, and a power source for powering the processing unit, the processing unit being arranged to receive input signals from the load sensor arrangement and to store data in the memory store relating to the loads sustained by the pin during use, the pin bearing arrangement includes power saving means for automatically reducing power consumption in the event that no loads meeting pre-set criteria are being sustained by the pin and the pin bearing arrangement is able to perform the function of a self-contained load data logging device for logging data concerning loads sustained by the pin.

2. An arrangement according to claim 1, wherein inside the pin there is provided an accelerometer.

3. An arrangement according to claim 1, wherein the load sensor arrangement includes a plurality of strain gauges.

4. An arrangement according to claim 1, wherein the pin bearing arrangement includes a pin greasing device.

5. An arrangement according to claim 1, wherein the pin bearing arrangement includes a data transfer means for transferring data from a component inside the pin to outside of the pin, the data transfer means comprising a transducer for convening electronic signals representing data stored in the memory store into electromagnetic radiation signals.

6. An arrangement according to claim 1, wherein the memory store comprises a memory store device arranged to be able to be removed from the pin whilst retaining data stored in the device.

7. An arrangement according to claim 1, wherein the power saving means is arranged to periodically ascertain whether the pin is being subjected to a load meeting the pre-set criteria and, in the event that it is ascertained that the pin is sustaining such a load, to cause the processor to start storing data in the memory store relating to the loads subsequently sustained by the pin.

8. An aircraft including a plurality of landing gears, wherein each landing gear includes a pin bearing arrangement according to claim 1.

9. A method of logging data concerning the loads sustained by a pin of a pin bearing arrangement in an aircraft, wherein the pin bearing arrangement includes power saving means for automatically reducing power consumption in the event that no loads meeting pre-set criteria are being sustained by the pin the method including the steps of measuring loads sustained by the pin, and storing data relating to the measured loads in a memory store inside the pin, the steps of the method being performed in a self-contained manner within the pin bearing arrangement.

10. A method according to claim 9, wherein the step of storing the data is effected by a processing unit inside the pin.

11. A method according to claim 10, wherein the processing unit is powered by means of a power source inside the pin.

12. A method of improving the design of an aircraft, the method including the steps of logging in a memory store data concerning the loads sustained by a pin of a pin bearing arrangement that forms part of the aircraft, extracting the data from the memory store, analysing said data and in view of said data modifying the design of the aircraft, wherein the step of logging said data is performed by performing the method of claim 9.

13. A method of assessing the operational lifetime of an aircraft or a component pan thereof, the method including the steps of logging in a memory store data concerning the loads sustained by a pin of a pin bearing arrangement that forms part of the aircraft, extracting the data from the memory store, assessing the operational lifetime of the aircraft or the component part thereof in view of said data, wherein the step of logging said data is performed by performing the method of claim 9.

14. A method of assessing the operational lifetime of an aircraft or a component part thereof, the method including the steps of logging in a memory store data concerning the loads sustained by a pin of a pin bearing arrangement that forms part of the aircraft, extracting the data from the memory store, assessing the operational lifetime of the aircraft or the component part thereof in view of said data, wherein the step of logging said data is performed by measuring loads sustained by the pin, and storing data relating to the measured loads in a memory store inside the pin, the measurement of loads and storage of data being performed in a self-contained manner within the pin bearing arrangement.

15. A method of manufacturing a pin bearing arrangement, the method including the steps of
- providing a bearing pin and a load measuring and data logging system comprising a processing unit, a memory store connector, a power source connector, a power saving means for automatically reducing power consumption in the event that no loads meeting pre-set criteria are being sustained by the pin and a load sensor arrangement for measuring loads,
- mounting the load sensor arrangement on or in the bearing pin,
- mounting the processing unit, the memory store connector, the power saving means and the power source connector inside the bearing pin,
- providing power to the load measuring and data logging system,
- applying independently known conditions to the load measuring and data logging system,
- measuring one or more outputs of the load measuring and data logging system, and
- adjusting calibration settings of the load measuring and data logging system in dependence on both the independently known conditions and the one, or more outputs as measured.

* * * * *